May 8, 1951 J. MEYER 2,551,960
MACHINE FOR ATTACHING PLASTIC HEADS TO PINS
Filed Sept. 22, 1948 4 Sheets-Sheet 1

INVENTOR.
JACK MEYER
BY
ATTORNEY

May 8, 1951 J. MEYER 2,551,960
MACHINE FOR ATTACHING PLASTIC HEADS TO PINS
Filed Sept. 22, 1948 4 Sheets-Sheet 3

INVENTOR.
JACK MEYER
BY
ATTORNEY

May 8, 1951   J. MEYER   2,551,960
MACHINE FOR ATTACHING PLASTIC HEADS TO PINS
Filed Sept. 22, 1948   4 Sheets-Sheet 4
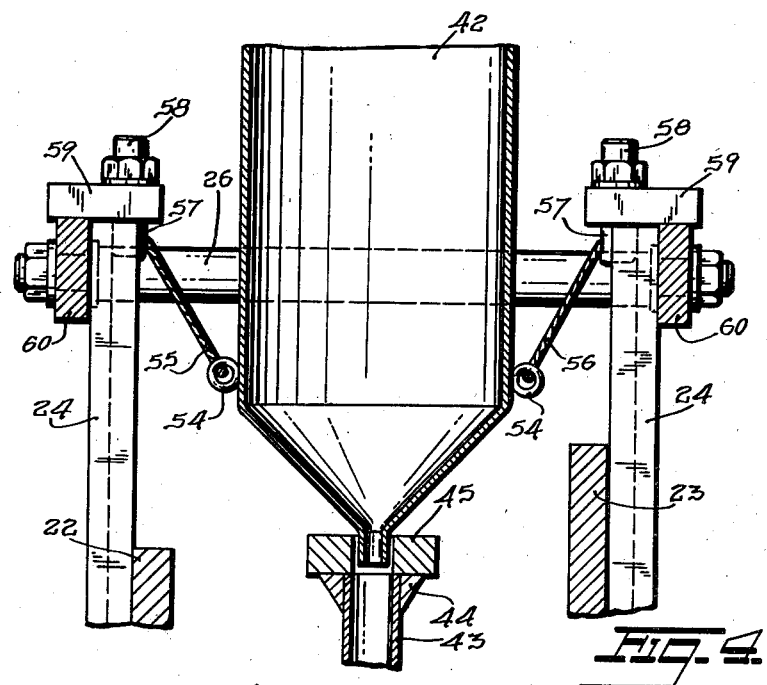
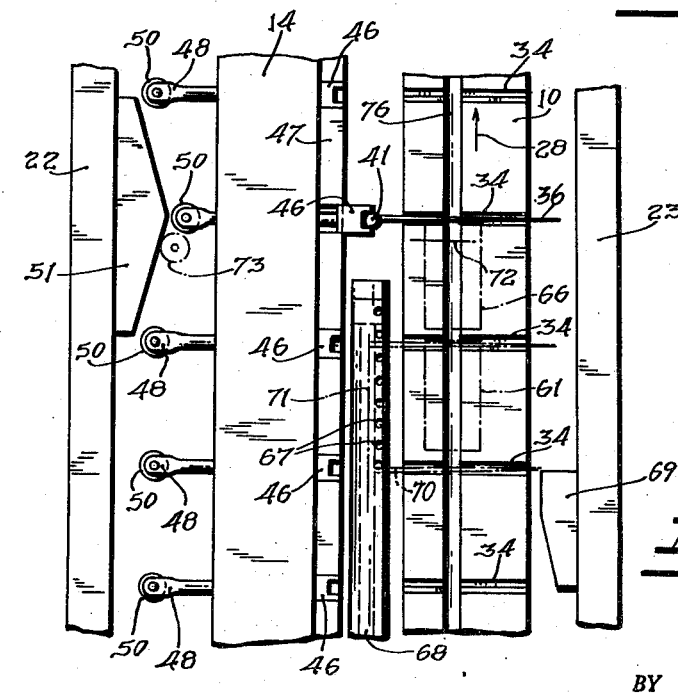
INVENTOR.
JACK MEYER
BY
*Zoltan Holcoheh*
ATTORNEY Patented May 8, 1951

2,551,960

UNITED STATES PATENT OFFICE 2,551,960

MACHINE FOR ATTACHING PLASTIC HEADS TO PINS

Jack Meyer, New York, N. Y.

Application September 22, 1948, Serial No. 50,528

9 Claims. (Cl. 18—1)

This invention relates to new and useful improvements in the art of making hatpins, corsage pins and the like, and, more particularly, the invention provides a novel and valuable method and apparatus for attaching plastic ball-heads to the pin-shafts, whereby, with a carrying out of the method facilitated by a simple and compact machine devised for the purpose, high-speed production of finished pins of a superior character is attained. While ball-heads will herein be referred to, it is to be understood that the heads may be of any desired shape; as changes in this regard, in respect to both the method and the machine of the invention, may be simply taken care of, as well also as changes in the diameter and/or length of the pin shafts.

The new machine as preferably embodied involves the use of a plurality of rotating magazines, one for transporting a plurality of the ball-heads and the other for transporting a plurality of the pin-shafts, with both magazines continuously rotating. Also according to the invention, the magazines are rotated in unison, preferably while fixed on a common shaft; and arrangements are provided such that, following a pick up by one magazine of one of its transported pin elements at a replenishment station, and concurrent pick up by the other magazine of one of its pin elements at a replenishment station for that magazine, a heating zone is reached so located that during travel of the magazines relative thereto a pin-shaft at the portion thereof to receive a ball-head is sharply raised in temperature.

With this heating effected, and during continued rotation of the magazines, a suitable means, as a fixed cam, becomes operative to effect a relative movement between the pin-shaft and the ball-head to be attached thereto, with this movement in a direction lengthwisely of the pin-shaft, to embed the pin-shaft in the ball-head.

Said magazines, each of wheel or drum form, are desirably rotated about a horizontal axis, so that after a pin-shaft has had its ball-head attached thereto, the finished pin may drop by gravity into a suitable receptacle. Associated with each magazine is a hopper, one for supplying the pin-shafts and the other for supplying the ball-heads at said replenishment stations, and between each hopper and the magazine to be replenished by it is a transfer means so operating that responsive to gravity the pin-shafts are delivered one at a time to the pin-shaft magazine and the ball-heads are delivered one at a time to the ball-head magazine, An object of the invention, in regard to the method, is to provide an improved way of securely coupling a preformed pin-shaft with a preformed ball-head; and this aspect of the invention is, broadly, the heating of the non-pointed end of a metal pin-shaft to a temperature such that when said end is contacted with the normally undentable superficies of a previously formed and set plastic ball-head, and then relative movement is effected between the pin-shaft and the ball-head in a direction lengthwisely of the pin-shaft, the latter becomes suitably embedded at its heated end in the body of the ball-head. During this embedding operation, the heat in the pin-shaft softens and renders somewhat fluent the plastic material of which the ball-head is made, so that the pin-shaft is adapted to act driven-nail fashion in entering the ball-head; with the final result that on rehardening of the ball-head consequent upon cooling of the pin-shaft the ball-head becomes securely and dependably locked on the pin-shaft.

In regard to the machine, one of the objects of the invention is to provide an apparatus which is entirely automatic in its operation, receiving the pin elements one by one from the aforesaid hoppers, and delivering the finished pins, all without manual operation of any kind.

A further object is to provide such an apparatus, and one which may be operated at high speed but without noise or injurious vibration, thereby to have a large output in proportion to the cost of the machine, the expense of its servicing, and the power required for its operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is, as to the said two rotary magazines, as to the major frame elements of the machine, as to parts of the transfer means aforesaid, and as to a conduit forming part of the heating means, a showing of the machine in top plan; this view being a section taken substantially on the line 1—1 of Fig. 2, but omitting the hoppers and various fixed shoe-type means for coacting with the pin-shaft magazine in special ways.

Fig. 4 is a detail view, being a section taken substantially on the line 4—4 of Fig. 2.

Fig. 5 is a similar view, being a section taken substantially on the line 5—5 of Fig. 2.

Fig. 6 is a fragmentary view, looking down on the machine at the aforesaid heating zone and at the region of attachment of a ball-head to a pin-shaft; this view being not a true top plan, but, instead, a horizontal development, with the view plane that indicated by the section line 6—6 of Fig. 2.

Figure 1:
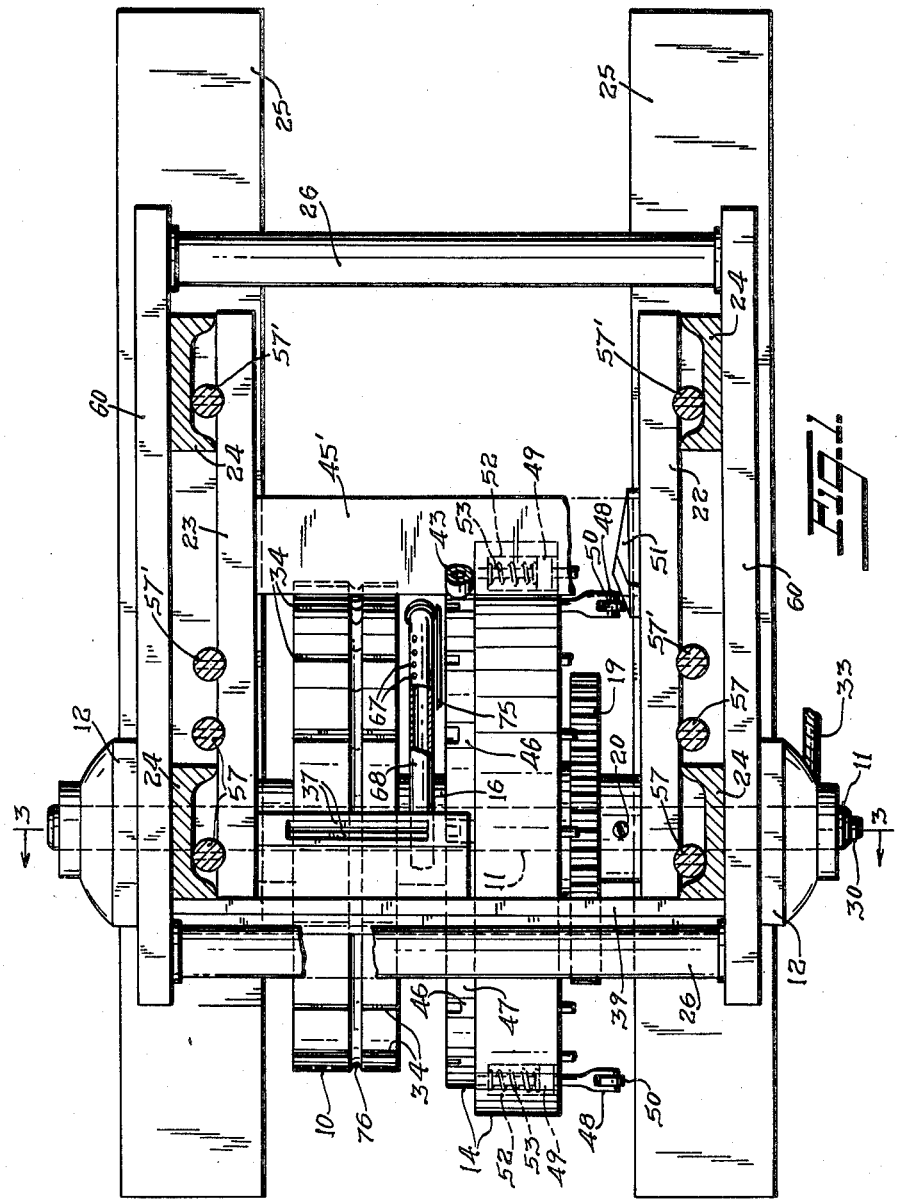

Referring to the drawings more in detail, the pin-shaft magazine is a wheel or drum 10 fixed on a horizontal shaft 11, said shaft journalled at 12, 12. The ball-head magazine is a wheel or drum 14 also fixed on said shaft. For thus fixing both magazines on said shaft, a feather 15 (Fig. 3) is used. The magazines are spaced by an intervening collar 16; and the magazine 10 is further served by a collar 17 held by a set-screw 18. Also keyed on the shaft 11, by the feather 15, is a spur gear 19 held by a set-screw 20; a washer 21 being provided between said gear and the magazine 14.

Figure 2:
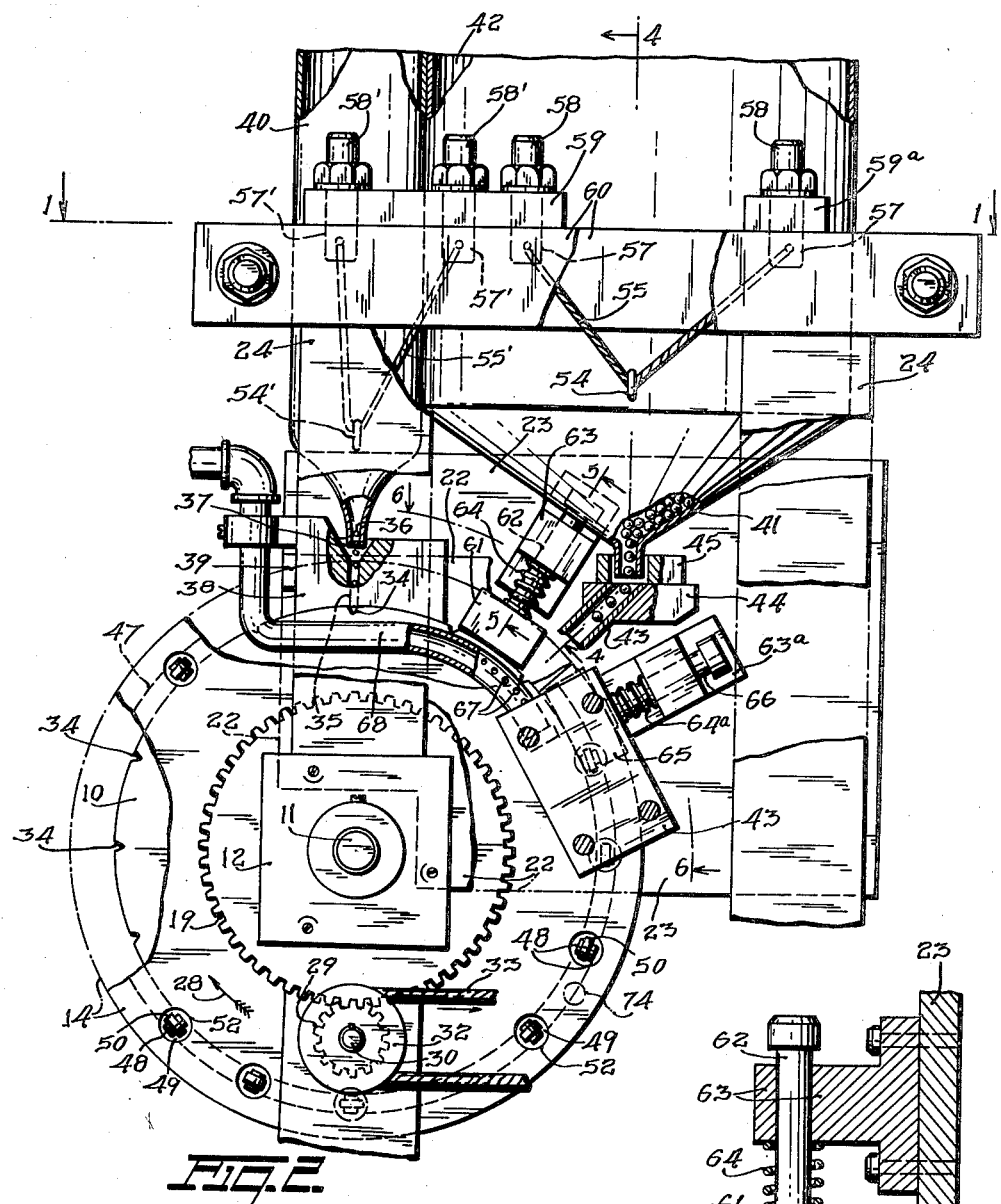
Fig. 2 is a side elevation of the machine, looking from the side thereof at the bottom of Fig. 1; this view having various parts partially broken away to reveal parts therebeyond.
Figure 3:
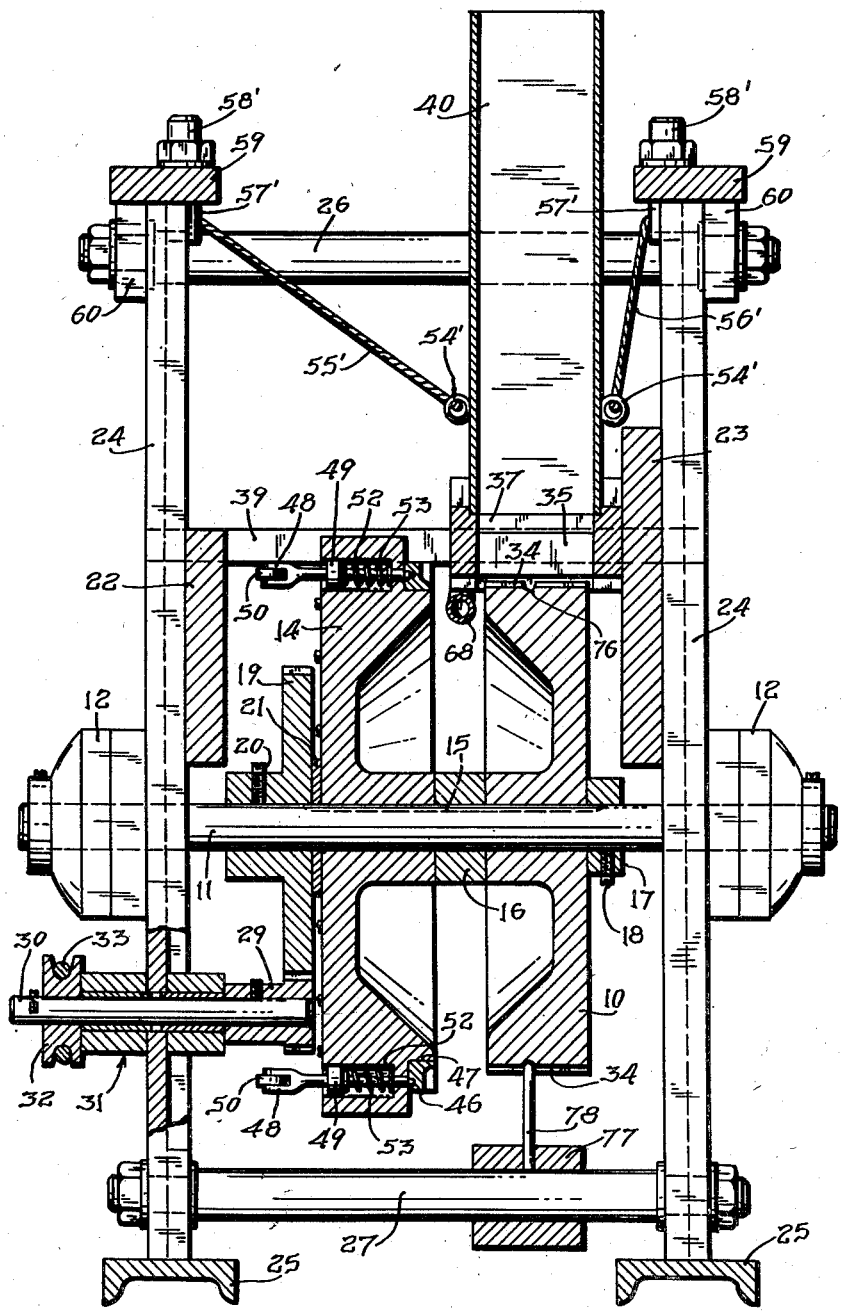
Fig. 3 is a transverse vertical section, taken substantially on the line 3—3 of Fig. 1.

The journals 12, 12 at the opposite sides of the machine are carried by vertically arranged horizontally extending side plates 22 and 23, said plates mounted on channel posts 24 (Figs. 1 and 2). Two such posts are at each side of the machine, the posts of each pair at their bottoms being secured to channel footing bars 25 (Figs. 1 and 3). Laterally of the machine, the posts 24 are coupled in pairs by top horizontal rods 26 and bottom horizontal rods 27.

Both magazines are continuously rotated in the direction of the arrows 28 of Figs. 2 and 6, by meshing of a spur pinion 29 (Figs. 2 and 3) with the gear 19; said pinion suitably fixed on a shaft 30 mounted as shown at 31 and fixedly carrying a pulley 32 engaged by a belt 33 driven from a suitable electric motor.

The pin-shaft magazine 10 has a cylindrical outer periphery traversed at uniformly circumferentially spaced intervals by sixteen transverse grooves 34 of V-shaped cross-section (Figs. 1, 2 and 3), each for cradling an individual pin-shaft. As the magazine 10 in its rotation brings a groove 34 centrally in line with and immediately below the lower end of a vertical channel 35, a pin-shaft 36, with its pointed end directed away from the magazine 14, drops into said groove 34. This channel 35 is a downward extension from a laterally downwardly tapering trough 37 in a block 38 suitably secured to a cross-bar 39.

The bottom of the block 38 is arcuately concavely curved in conformity with the cylindricity of the periphery of the magazine 10, and acts as a protective shoe to prevent entrance of more than a single pin-shaft into a groove 34. The pin-shafts are supplied to the trough 37 through the open bottom of a hopper 40.

The ball-heads 41, in a hopper 42, are delivered to a cylindrical chute 43 (Figs. 1 and 2) set in a block 44 fixed to the bottom central portion (Fig. 4) of a cross-bar 45 secured to the side plates 22 and 23. The lower delivery end of said chute is so placed that, as a pin-shaft is delivered to a groove 34 of the magazine 10, a ball-head is delivered to the magazine 14. For holding such ball-heads uniformly spaced circumferentially of the magazine 14 are sixteen cup-members 46 (Figs. 1 and 3). These are all alike and parts of sixteen like devices, so that a description of one will suffice as a description of all.

The magazine 14 has a reduced cylindrical portion 47 (Figs. 2, 3 and 6); and the exterior of a cup-member 46, opposite the bottom of the cup formation therein, is concavely arcuately rounded to match the periphery of said portion 47, this to prevent rotational movement of a stem 48 to which said cup-member is made fast by the threaded connection indicated in Fig. 3.

Said stem 48 fixedly carries a disk-plunger 49 and at its outer end has mounted thereon a roller 50 for constituting a follower relative to a cam-block 51 fixed to the side plate 23. The stem 48, beyond its connection with its cup-member 46, passes into and through a well-like cylindrical recess 52 in the main portion of the magazine 14 extended in a direction parallel to the axis of rotation of said magazine. The disk-plunger 49 is backed by an expansile coil spring 53.

The ball-head hopper 42 has exteriorly fixed thereon at opposite sides thereof ring-eyes 54 (Figs. 2 and 3), by means of which said hopper is slung from the bight portions of V-hung cables 55 and 56 terminally secured at apertures through the lower unthreaded shank portions 57 (see also Fig. 1) of nut-clamped bolts 58 sent vertically downward through top blocks 59 and 59ᵃ. At each side of the machine there are a pair of these blocks; each such pair suitably secured atop one of two like side bars 60 each fastened to the two posts 24 at a side of the machine.

The pin-shaft hopper 40 is similarly suspended, as indicated (Figs. 1, 2 and 4) at 54′, 55′, 56′, 57′ and 58′. These parts marked with reference numerals with primes added corresponding, respectively, to the parts marked with the same reference numerals without primes; it being noted from Fig. 2 that the blocks 59 are longer than the blocks 59ᵃ, since the latter takes only one of the cable-suspending bolts 58 whereas the former takes the remaining three of such bolts at a side of the machine.

After a pin-shaft in a groove 34 of the magazine 10 passes beyond the end of the shoe formation at the bottom of the block 38 at the right in Fig. 2, an auxiliary shoe 61 (Figs. 2 and 5) is encountered. This shoe 61 is fixed on the lower end of a plunger 62 reciprocably mounted in a bracket 63 secured to the side plate 23; and said shoe is held against the magazine 10 by an expansile spring 64. As soon as said groove 34 is advanced beyond the shoe 61, a second auxiliary shoe 65 is encountered, this on a plunger 66 like the plunger 62, said plunger reciprocably mounted in a bracket 63ᵃ like the bracket 63, and served by a spring 64ᵃ like the spring 64. In Fig. 6 these shoes 61 and 65 are indicated in outline in dot and dash lines.

The heating device for the end of a pin-shaft to be embedded in a ball-head is shown as including a gas burner means 67 (Figs. 1, 2 and 6) along an end length of a gas-feeding conduit 68 (seen also in Fig. 3).

Just before a pin-shaft reaches said burner means, the pin-shaft engages a fixed guide-block 69 (Fig. 6), and said pin-shaft is endwisely shifted toward the ball-head magazine 14, and so as to become disposed on the magazine 10 as indicated at 70, that is, with the non-pointed end of the pin-shaft thrust into the line 71.

Immediately thereafter, the shoe 61 is encountered by said pin-shaft, and the latter is held against accidental longitudinal shift, first by said shoe 61 and thereafter by the shoe 65. During travel of said pin-shaft along the major length of the shoe 61 and along a minor length of the shoe 65 the non-pointed end of the pin-shaft is heated by the flame at the burner means 67.

When said pin-shaft reaches about the location 72, a roller 50 of one of the sixteen ball-head carrying devices of the magazine 14 arrives at about the location indicated at 73, that is, such roller has almost reached the crest of the cam 51; and so now the spot on the superficies of the ball-head 41 shown in Fig. 6 is brought into touch with the non-pointed (and hot) end of said pin-shaft.

During the ensuing travel of said pin-shaft below the shoe 65, said ball-head is forced against the hot end of the pin-shaft and said pin-shaft end is embedded in the ball-head; such embedment being to a depth of about $\frac{3}{32}''$ in the case of a ball-head of the size illustrated. This embedment is completed as the last-named roller 50 arrives at the crest of the cam 51.

Now, while the two magazines continue further rotation in the direction of the arrows 28 of Figs. 2 and 6, there is cooling off of the pin-shaft, with the result that when the coupled pin-shaft and ball-head reach about the location indicated at 74 in Fig. 2 the ball-head is fast on the pin-shaft; at which location the finished pin will by gravity drop clear of both magazines. To prevent premature exit of a ball-head from a cup-member 46, a fixed plate of suitable outline may be interposed as indicated at 75 in Fig. 1. For very precise setting of the plane of rotation of the magazine 14, the same has an annular groove 76 in a plane perpendicular to the axis of the shaft 11; and on the cross-rod 27 vertically below said shaft a sleeve 77 is slidably adjustably carried by said cross-rod, said sleeve carrying a finger 78 for engaging the groove 76.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head.

2. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former.

3. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the first-named magazine being grooves extended laterally of the periphery thereof.

4. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the second-named magazine being cups, and there being spring-pressed plungers and said second-named magazine having well-like recesses extended parallelly with the axis of rotation of the magazines, each of said plungers being in one of said recesses and each of said plungers carrying one of said cups at the side of said second-named magazine facing a side of the first-named magazine.

5. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the second-named magazine being cups, and there being spring-pressed plungers and said second-named magazine having well-like recesses extended parallelly with the axis of rotation of the magazines, each of said plungers being in one of said recesses and each of said plungers carrying one of said cups at the side of said second-named magazine facing a side of the first-named magazine, said fixed cam being arranged to act on said plungers to endwisely move them and being opposite the side of the second-named magazine most remote from the first-named magazine.

6. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the second-named magazine being cups, and there being spring-pressed plungers and said second-named magazine having well-like recesses extended parallelly with the axis of rotation of the magazines, each of said plungers being in one of said recesses and each of said plungers carrying one of said cups at the side of said second-named magazine facing a side of the first-named magazine, said plungers carrying rollers at the ends thereof opposite to their ends carrying said cups, said rollers for coacting with said fixed cam.

7. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the second-named magazine being cups, and there being spring-pressed plungers and said second-named magazine having well-like recesses extended parallelly with the axis of rotation of the magazines, each of said plungers being in one of said recesses and each of said plungers carrying one of said cups at the side of said second-named magazine facing a side of the first-named magazine, each cup having two sides, a bottom and only one end.

8. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the second-named magazine being cups, and there being spring-pressed plungers and said second-named magazine having well-like recesses extended parallelly with the axis of rotation of the magazines, each of said plungers being in one of said recesses and each of said plungers carrying one of said cups at the side of said second-named magazine facing a side of the first-named magazine, each cup having two sides, a bottom and only one end, said cup end being at the part of the cup adjacent to the second-named magazine.

9. Apparatus for the purpose described, comprising a rotary magazine for pin-shafts, a rotary magazine for plastic ball-heads, a plurality of receptors uniformly circumferentially spaced around the periphery of the first-named magazine each for holding one pin-shaft, a like plurality of receptors uniformly circumferentially spaced around a periphery of the second-named magazine each for holding one ball-head, said magazines being arranged alongside each other for rotation about a common axis, the receptors of each magazine being spaced around a like-diametered circle concentric with said axis, means for maintaining each receptor of one magazine in line with a receptor of the other magazine, means for continuously rotating both magazines at the same speed to maintain such receptors-alignment, means for heating a pin-shaft as it and an oppositely located ball-head approach a coupling station for said pin-shaft and said ball-head, and means for relatively moving said pin-shaft and said ball-head while said pin-shaft is thus heated thereby to force an end of the pin-shaft driven-nail fashion into said ball-head, the last-named means including a fixed cam for thrusting said ball-head against said end of the pin-shaft, said heating means being lengthwisely extended in the direction of travel of said receptors, and there being a camming means, operating prior to operation of said fixed cam, for endwisely moving said pin-shaft to extend said end thereof overlyingly of said heating means and to bring said end closer to said ball-head, and there further being a spring-urged shoe means for impositively clamping said pin-shaft against retrograde endwise movement on operation of said fixed cam whereby said thrust of the ball-head against the pin-shaft will embed the latter in the former, the receptors of the second-named magazine being cups, and there being spring-pressed plungers and said second-named magazine having well-like recesses extended parallelly with the axis of rotation of the magazines, each of said plungers being in one of said recesses and each of said plungers carrying one of said cups at the side of said second-named magazine facing a side of the first-named magazine, each cup having two sides, a bottom and only one end, the second-named magazine having a reduced cylindrical portion and the exterior portion of each cup opposite the cup bottom being concavely arcuate for engagement with the periphery of said reduced cylindrical portion thereby to prevent rotational movement of the plunger carrying such cup.

JACK MEYER.

REFERENCES CITED

The following references are of record in the file of this patent:

UNITED STATES PATENTS

| Number | Name | Date |
|---|---|---|
| 917,627 | Lizotte | Apr. 6, 1909 |
| 1,272,634 | De Escobales | July 16, 1918 |
| 2,052,616 | Gardes | Sept. 1, 1936 |
| 2,281,008 | Poux | Apr. 28, 1942 |
| 2,303,005 | Swangren | Nov. 24, 1942 |
| 2,304,036 | Tegarty | Dec. 1, 1942 |
| 2,356,086 | Poux | Aug. 15, 1944 |